(12) United States Patent
Yang et al.

(10) Patent No.: US 7,321,215 B1
(45) Date of Patent: Jan. 22, 2008

(54) WIRELESS 3D AUTO-OFFSET SYSTEM FOR ROBOT ARMS

(75) Inventors: Sheng-Hua Yang, Hsinchu (TW); Chia-Feng Liang, Taichung County (TW)

(73) Assignee: Powerchip Semiconductor Corp., Hsin-Chu (TW)

( * ) Notice: Subject to any disclaimer, the term of this patent is extended or adjusted under 35 U.S.C. 154(b) by 0 days.

(21) Appl. No.: 11/500,901

(22) Filed: Aug. 9, 2006

(51) Int. Cl.
*B25J 19/04* (2006.01)

(52) U.S. Cl. .................... 318/568.16; 318/568.21; 901/30; 901/47

(58) Field of Classification Search ......... 318/568.16, 318/568.21, 648, 649, 558; 901/30, 46, 47; 73/1.31, 1.73, 290 R, 301, 323; 356/138, 356/139.1; 33/290
See application file for complete search history.

(56) References Cited

U.S. PATENT DOCUMENTS

| | | | |
|---|---|---|---|
| 5,239,855 A * | 8/1993 | Schleifer et al. ............. | 73/1.75 |
| 5,537,200 A * | 7/1996 | Kumagai et al. .......... | 356/4.01 |
| 6,237,235 B1 * | 5/2001 | Feist et al. .................... | 33/295 |
| 7,098,518 B1 * | 8/2006 | Mostafazadeh et al. ..... | 257/433 |

\* cited by examiner

*Primary Examiner*—Bentsu Ro
(74) *Attorney, Agent, or Firm*—Birch, Stewart, Kolasch & Birch, LLP

(57) ABSTRACT

A wireless 3D auto-offset system for robot arms is provided. The wireless 3D auto-offset monitor sensor of the system includes an electronic leveling sensor, a Z-axis optical scale, and an XY-axes CCD monitor sensor for monitor and judgment of level states, offsets, and gaps, respectively.

7 Claims, 14 Drawing Sheets

US 7,321,215 B1

WIRELESS 3D AUTO-OFFSET SYSTEM FOR ROBOT ARMS

BACKGROUND OF THE INVENTION

1. Field of the Invention

The invention relates to a corrector, and in particular to a wireless three-dimensional (3D) auto-offset system for robot arms.

2. Description of the Related Art

Robot arms complying with the standard mechanical interface (SMIF) are utilized in the manufacturer of silicon wafers to automatically draw wafers out of front opening unified pods (FOUPs) and move the wafers to process tools to prevent wafer contamination.

A pair of pincettes, however, installed at the front of a robot arm of a process tool is frequently deformed due to various abnormal conditions, such that robot arms may need to be adjusted accordingly at any time to ensure product quality and production efficiency. Currently, robot arms are artificially and subjectively adjusted. Additionally, the capacity inside a process tool is too small to accommodate an equipment worker. As described, artificial adjustment and worker size may indirectly affect the quality and time required of recovering a process tool.

Thus, a wireless 3D auto-offset system for robot arms capable of improving adjustment quality is desirable.

BRIEF SUMMARY OF THE INVENTION

A wireless 3D auto-offset system for robot arms is provided. The system includes a wireless 3D offset monitoring sensor and a corrector. The wireless 3D offset monitoring sensor further includes an electronic tilt detector. The electronic tilt detector further includes an arcuate body and a sensor. The interior of the arcuate body is filled with liquid material and having a bubble. The sensor detects the position of the bubble. The corrector retrieves and displays the bubble positions using the sensor on a screen thereof, determines whether a process apparatus is horizontally located according to a predefined standard range, and, if not, calculates an offset value of the process apparatus.

Another wireless 3D auto-offset system for robot arms is provided.

The system includes a three-pin process plate, a wireless 3D offset monitoring sensor, and a corrector. The three-pin process plate having three pins. The wireless 3D offset monitoring sensor includes an optical scale installed above the three-pin process plate. The optical scale is a dual optical scale, in which one optical scale serves as a transmitter to transmit a parallel beam of light and the other optical scale serves as a receiver to receive the parallel beam of light. The corrector retrieves an obstructive state of receiving the parallel beam of light from the wireless 3D offset monitoring sensor, displays light signals on a screen thereof, and determines whether a Z-axis gap size of each pin of the three-pin process plate exceeds a threshold value.

Another wireless 3D auto-offset system for robot arms is provided. The system includes a process plate, a wireless 3D offset monitoring sensor, and a corrector. The process plate having a center mark. The wireless 3D offset monitoring sensor is installed above the three-pin process plate and comprises a sensor provided with a criterion mark. The sensor compares a center position of the center mark with a center position of the criterion mark. The corrector retrieves relative position information according to the center positions of the center mark and the criterion mark, determines whether an offset is detected according to the relative position information, and, if so, calculates an offset value.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
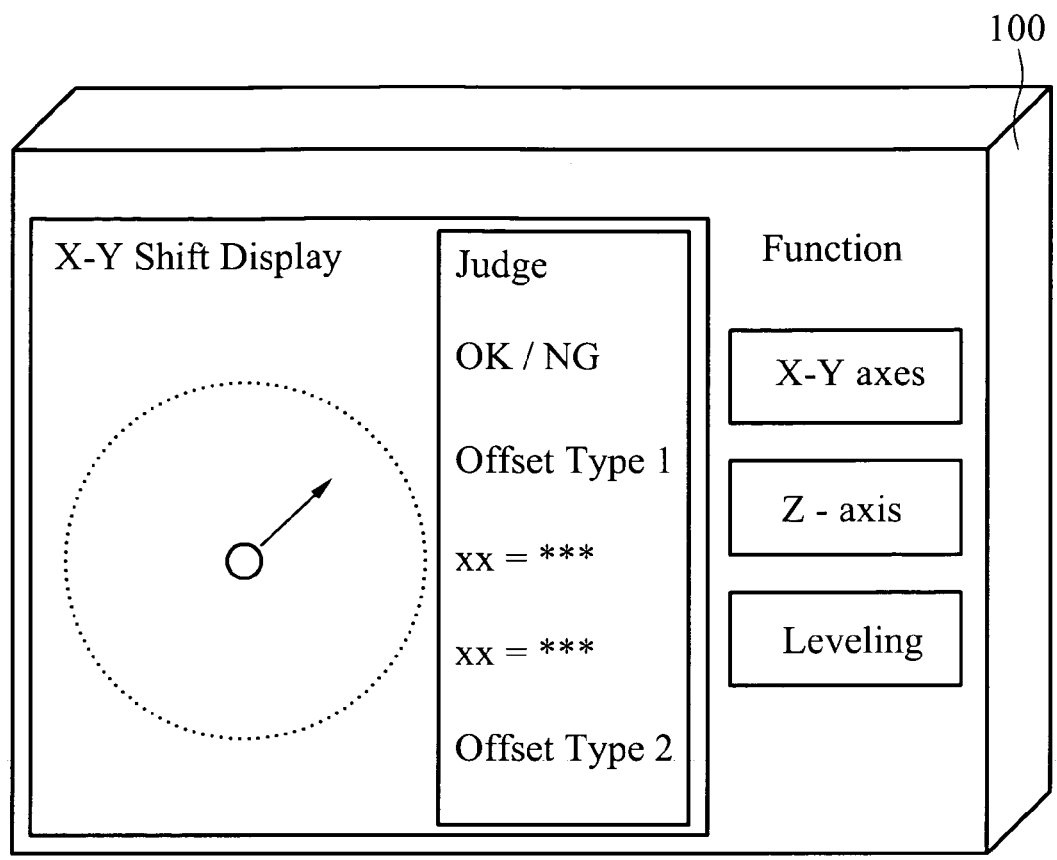
FIG. 1 is a schematic view of an embodiment of a corrector.

Several exemplary embodiments of the invention are described with reference to FIGS. 1 through 10C, which generally relate to a wireless 3D auto-offset system. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a wireless 3D auto-offset system for robot arms.

An embodiment of a wireless 3D auto-offset system for robot arms employs a 3D offset corrector and a 3D offset monitor sensor for a robot arm to reduce artificial adjustment inaccuracy. The 3D offset monitor sensor includes an electronic leveling sensor and an optical scale. The electronic leveling sensor can accurately detect level states of process plates or pincettes. The optical scale can inspect safety heights of the Z-axis for process plates and pincettes.

FIG. 1 is a schematic view of an embodiment of a corrector.

Corrector 100 is a lower power signal receiver capable of displaying XY-axes offset judgment, Z-axis gap judgment, and level judgment.

Figure 2:
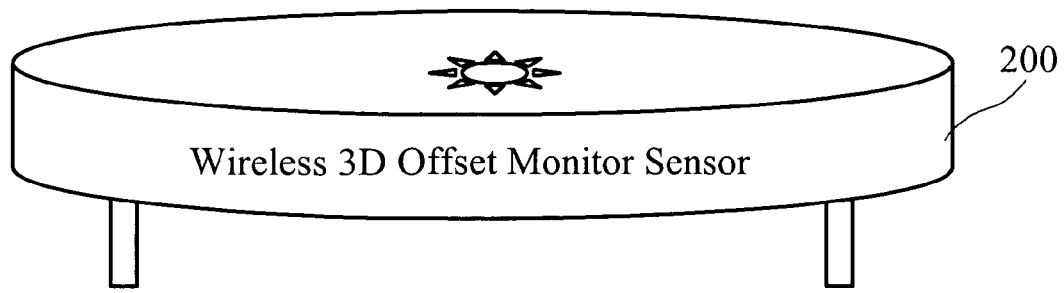
FIG. 2 is a schematic view of an embodiment of a wireless 3D offset monitor sensor.

FIG. 2 is a schematic view of an embodiment of a wireless 3D offset monitor sensor.

Wireless 3D offset monitor sensor 200 is a lower power signal transmitter, including an electronic leveling sensor, a Z-axis optical scale, and an XY-axes electronic charge-coupled device (CCD) sensor. The XY-axes electronic CCD sensor monitors real-time states of the XY-axes offsets. The Z-axis optical scale monitors the gap size between pins of a three-pin process plate and a wafer. The electronic leveling sensor monitors level states of wireless 3D offset monitor sensor 200. Additionally, corrector 100 connects to wireless 3D offset monitor sensor 200 using a wireless link.

Figure 3:
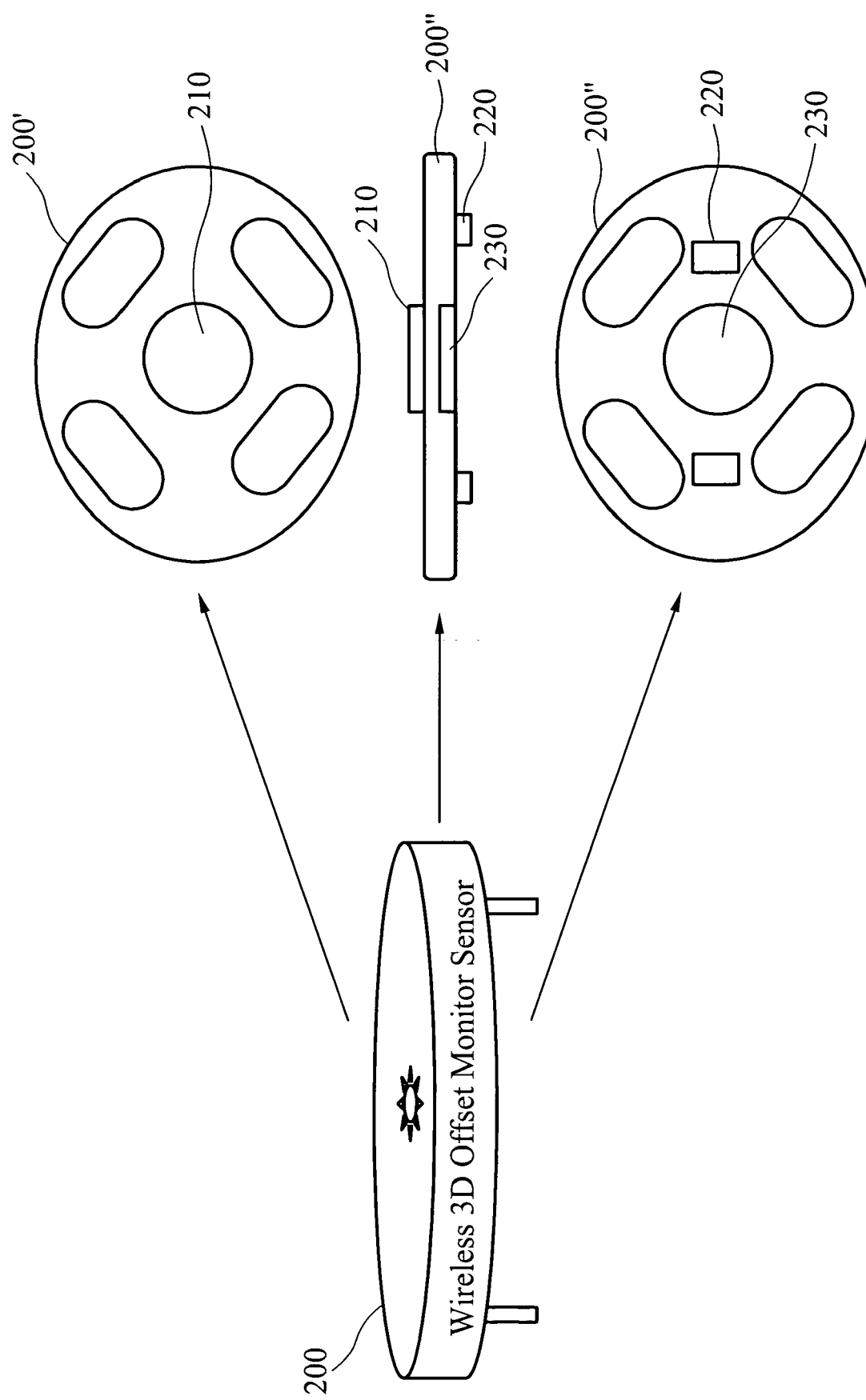
FIG. 3 shows top view, side view, and bottom view of the wireless 3D offset monitor sensor 200.

FIG. 3 shows the top view, the side view, and the bottom view of wireless 3D offset monitor sensor 200.

As described, wireless 3D offset monitor sensor 200 includes electronic leveling sensor 210 (as shown by top view 200' of wireless 3D offset monitor sensor 200), optical scale 220 (as shown by side view 200" of wireless 3D offset monitor sensor 200), and XY-axes electronic CCD sensor 230 (as shown by bottom view 200''' of wireless 3D offset monitor sensor 200).

Figure 4:
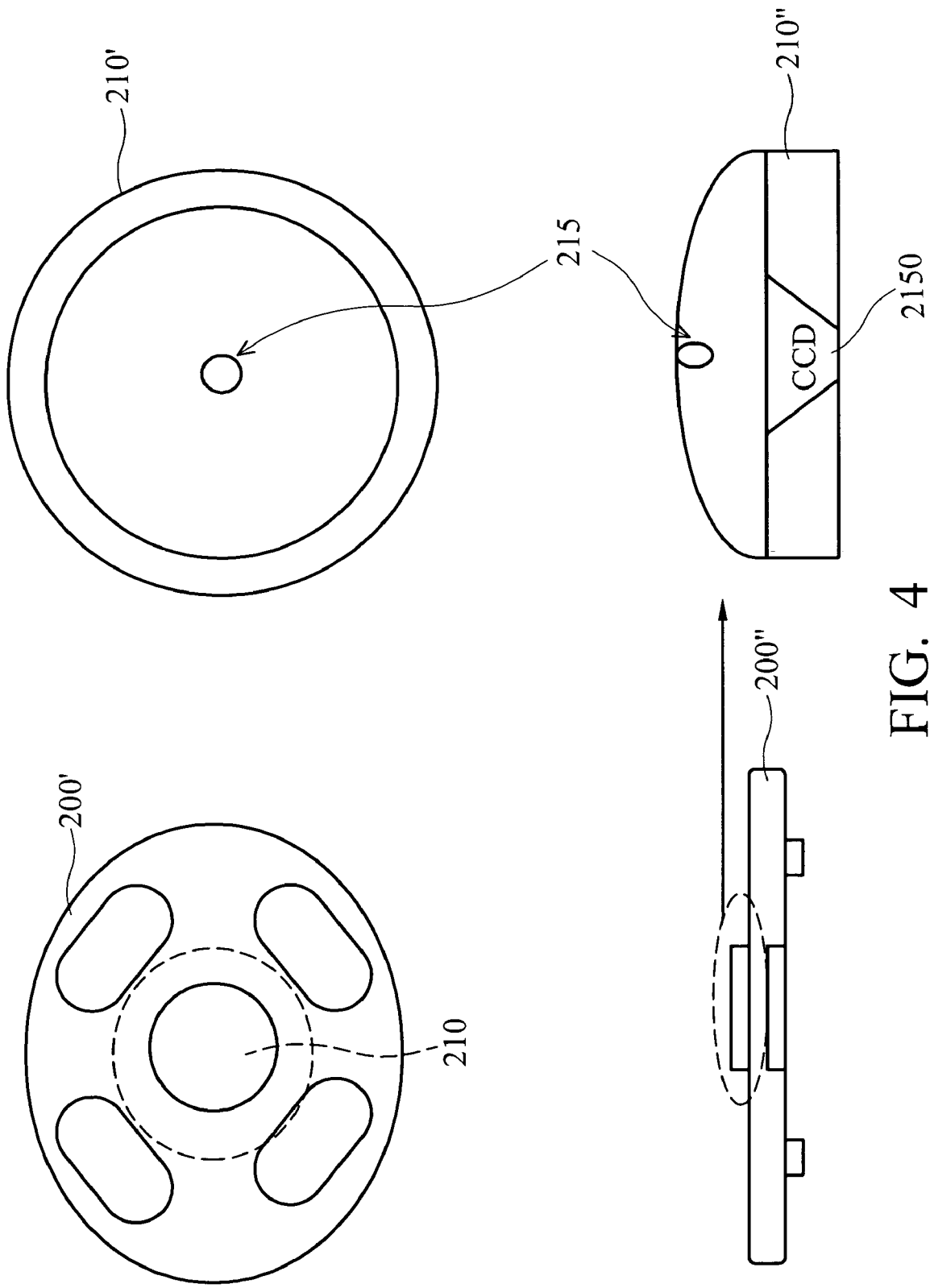
FIG. 4 is a schematic view of an embodiment of the architecture of electronic leveling sensor 210.

As shown in FIG. 4, electronic leveling sensor 210 includes an arcuate body and a sensor 2150. The interior of the arcuate body is filled with liquid material and having a bubble 215. Referring to top view 210' and side view 210" of electronic leveling sensor 210, when electronic leveling sensor 210 is horizontally located, bubble 215 is located at the top of the center position thereof. Level states of a pair of pincettes, pins of a three-pin process plate, and a process plate can be determined according to positions of bubble 215.

Figure 5A:
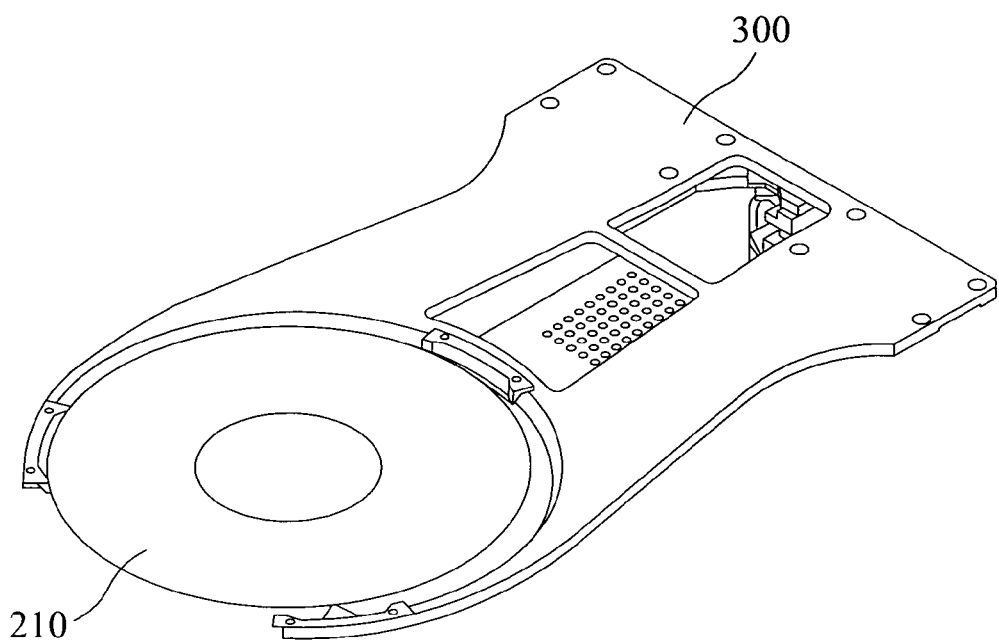
FIG. 5A is a schematic view of inspecting a level state of a pair of pincettes installed at the front of a robot arm.
Figure 5B:
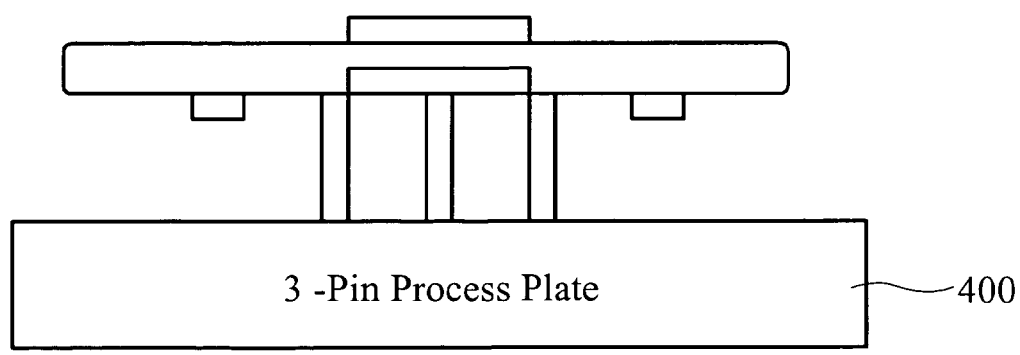
FIG. 5B is a schematic view of inspecting a level state of a three-pin process plate.
Figure 5C:
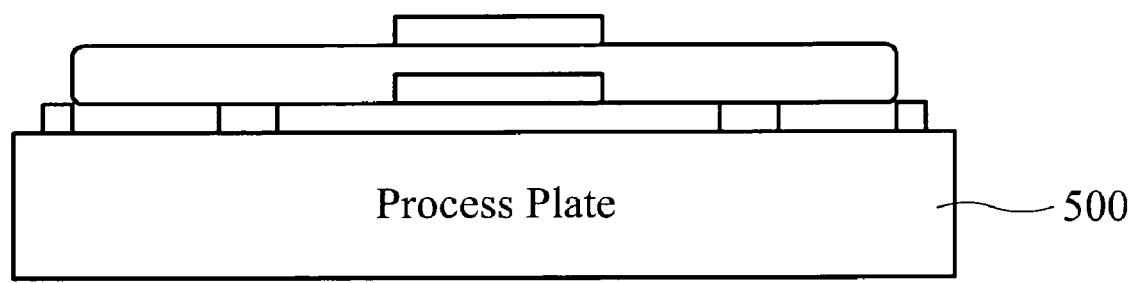
FIG. 5C is a schematic view of inspecting a level state of a process plate.

Referring to FIG. 5A, a pair of pincettes 300 installed at the front of a robot arm clips wireless 3D offset monitor sensor 200 to detect the level state thereof according to the position of bubble 215 of electronic leveling sensor 210, thereby detecting the level state of the robot arm. Referring to FIG. 5B, wireless 3D offset monitor sensor 200 is installed above the pins of three-pin process plate 400 to detect level states of the pins according to the position of bubble 215. Referring to FIG. 5C, wireless 3D offset monitor sensor 200 is installed above process plate 500 to detect level states of the pins according to the position of bubble 215.

Figure 6A:
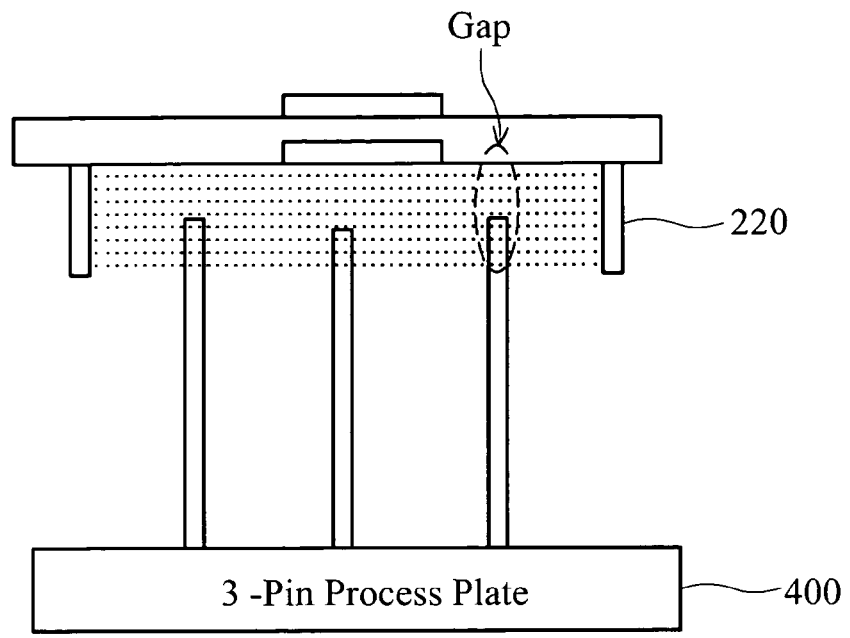
FIGS. 6A and 6B are schematic views of inspecting Z-axis gap sizes using an optical scale.
Figure 6B:
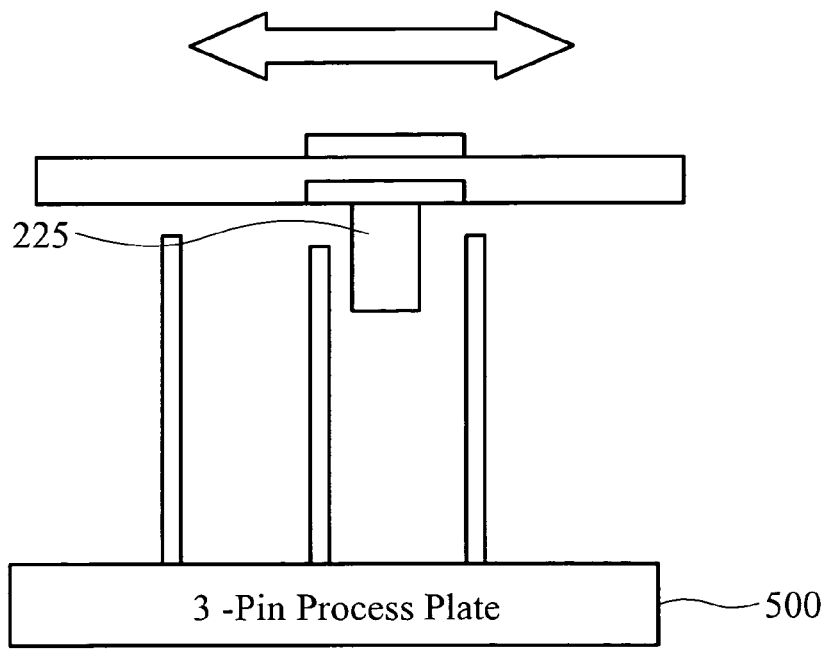

Additionally, the Z-axis gap size between wireless 3D offset monitor sensor 200 and a process plate (three-pin process plate 400 or process plate 500) can be obtained using optical scale 220. Referring to FIG. 6A, optical scale 220 is a dual optical scale, in which one optical scale serves as a transmitter to transmit a parallel beam of light, and the other optical scale serves as a receiver to receive the parallel beam of light and responds with an obstructive state to corrector 100 for determination of the Z-axis gap size. Further, when the parallel beam of light does not touch the pins of three-pin process plate 400, a pair of pincettes 300 can clip wireless 3D offset monitor sensor 200 to move forward and backward to touch the parallel beam of light for determining the size of the Z-axis gap.

Figure 7A:
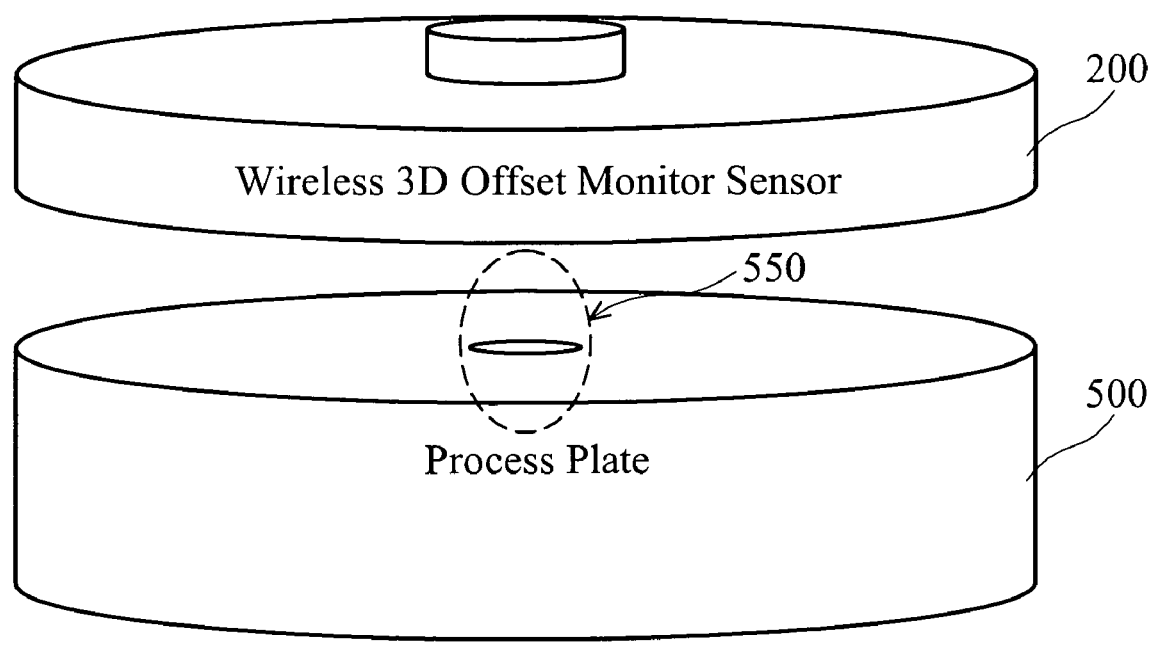
FIGS. 7A and 7B are schematic views of inspecting an offset using an XY-axes CCD monitor sensor.
Figure 7B:

XY-axes electronic CCD sensor 230 detects a center mark of process plate 500 and responds with a sensed image to corrector 100 for comparison with a criterion mark, determining whether an offset along the XY-axes for process plate 500 or a robot arm exists. As shown in FIG. 7A, wireless 3D offset monitor sensor 200 is installed above process plate 500 to sense center mark 550. Referring to FIG. 7B, criterion mark 235 is marked on process plate 500. XY-axes electronic CCD sensor 230 senses center mark 550, obtains relative position information between center mark 550 and criterion mark 235, determines whether an offset is detected according to the relative position information, and, if so, determines whether the offset is in a predefined range, indicating that an offset value for a robot arm along the XY-axes is obtained.

Corrector 100 retrieving sensing information from wireless 3D offset monitor sensor 200 and displays sensing results when calculated. As described, corrector 100 is a lower power signal receiver and is capable of displaying XY-axes offset judgment, Z-axis gap judgment, and level judgment, as shown in FIG. 1. Detailed operations for an electronic leveling sensor, a Z-axis optical scale, and an XY-axes electronic CCD sensor are further described in the following.

Figure 8A:
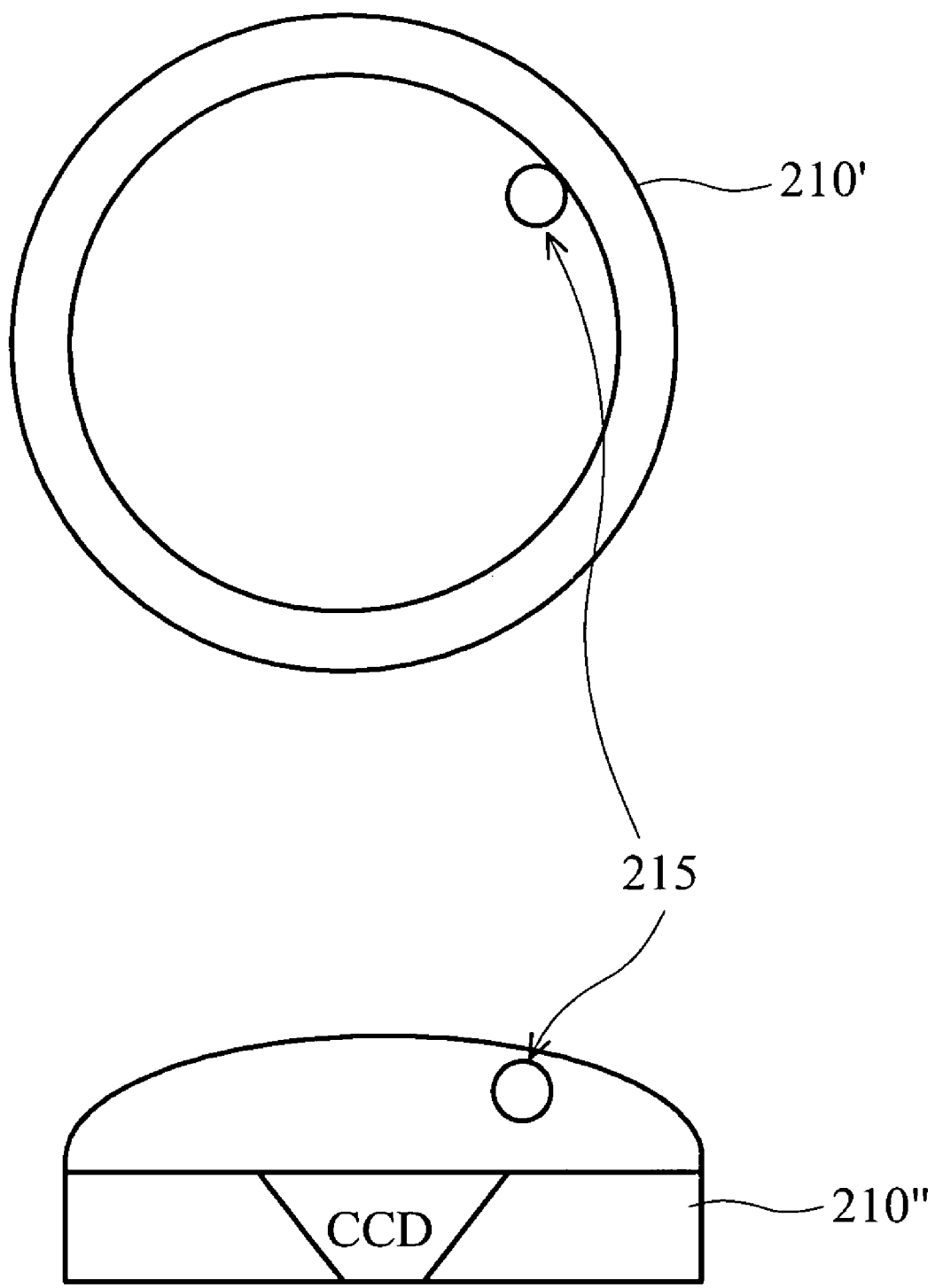
FIG. 8A is a schematic view of inspecting a level state of a process apparatus using an electronic leveling sensor.
Figure 8B:
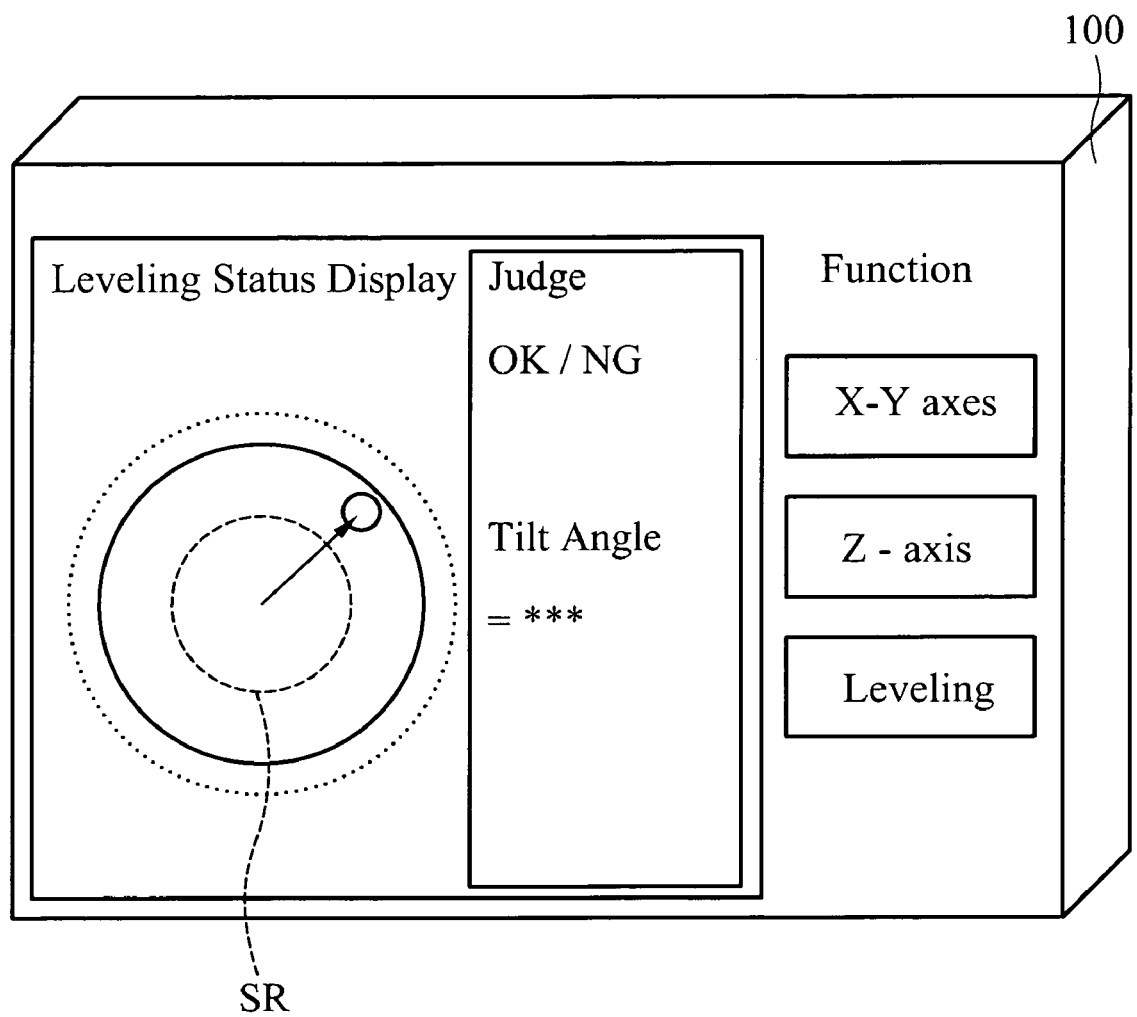
FIG. 8B is a schematic view of displaying the level state shown in FIG. 8A.

Referring to FIG. 8A, electronic leveling sensor 210 can determine level states of a pair of pincettes 300 installed at the front of a robot arm, the pins of three-pin process plate 400, and process plate 500 and determines whether the position of bubble 215 is located in a standard range (SR), as shown in FIG. 8B. A detailed description of the process thereof is provided in the following.

CCD sensor 2150 of electronic leveling sensor 210 first detects positions of bubble 215 and responds with a detected position to corrector 100. Corrector 100 displays the detected position of bubble 215 on a screen thereof and determines level states of a pair of pincettes 300 installed at the front of a robot arm, the pins of three-pin process plate 400, and process plate 500 according to the standard range, thus determining whether an offset is allowable and detecting an offset angle.

Figure 9A:
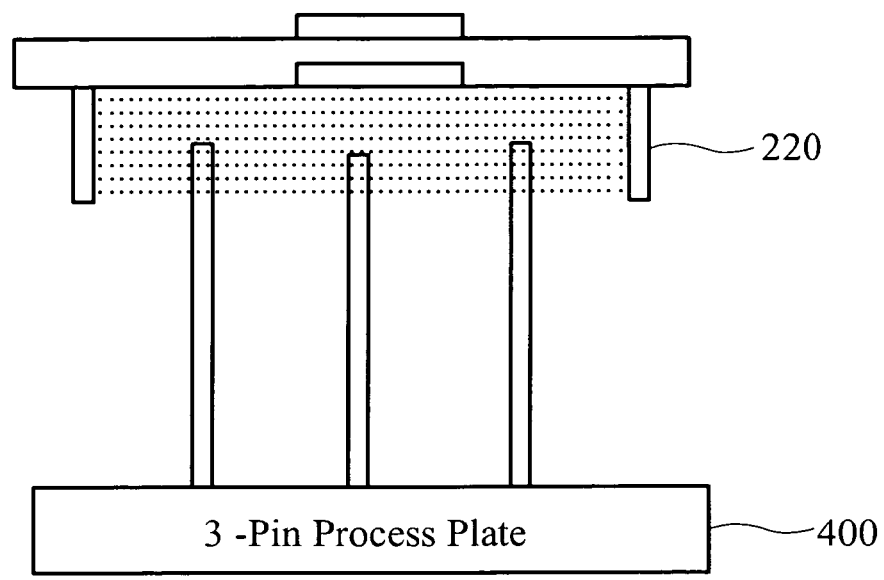
FIGS. 9A and 9B are schematic views of inspecting Z-axis gap sizes using an optical scale.
Figure 9B:
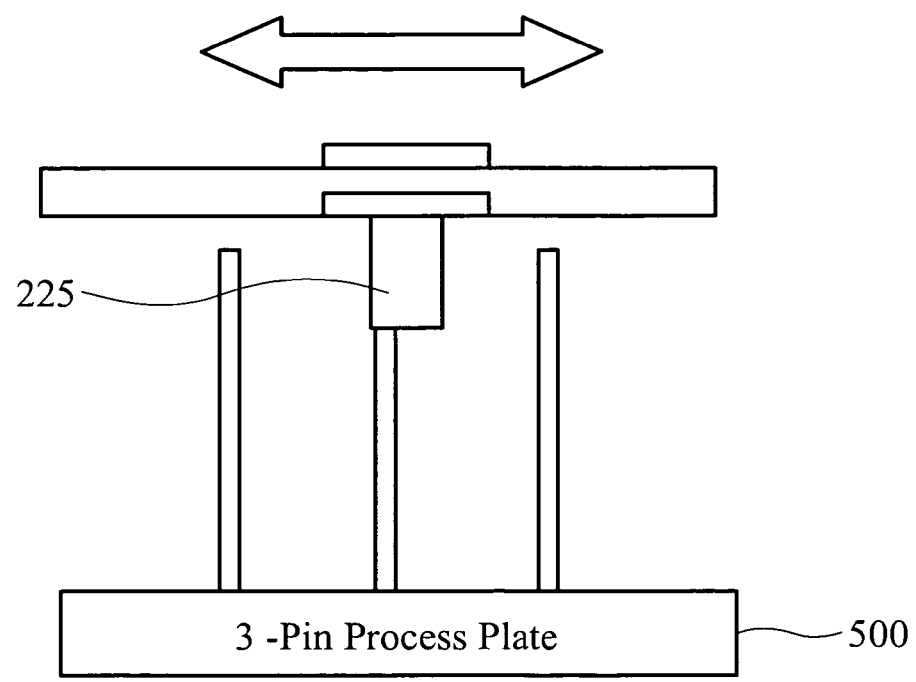
Figure 9C:
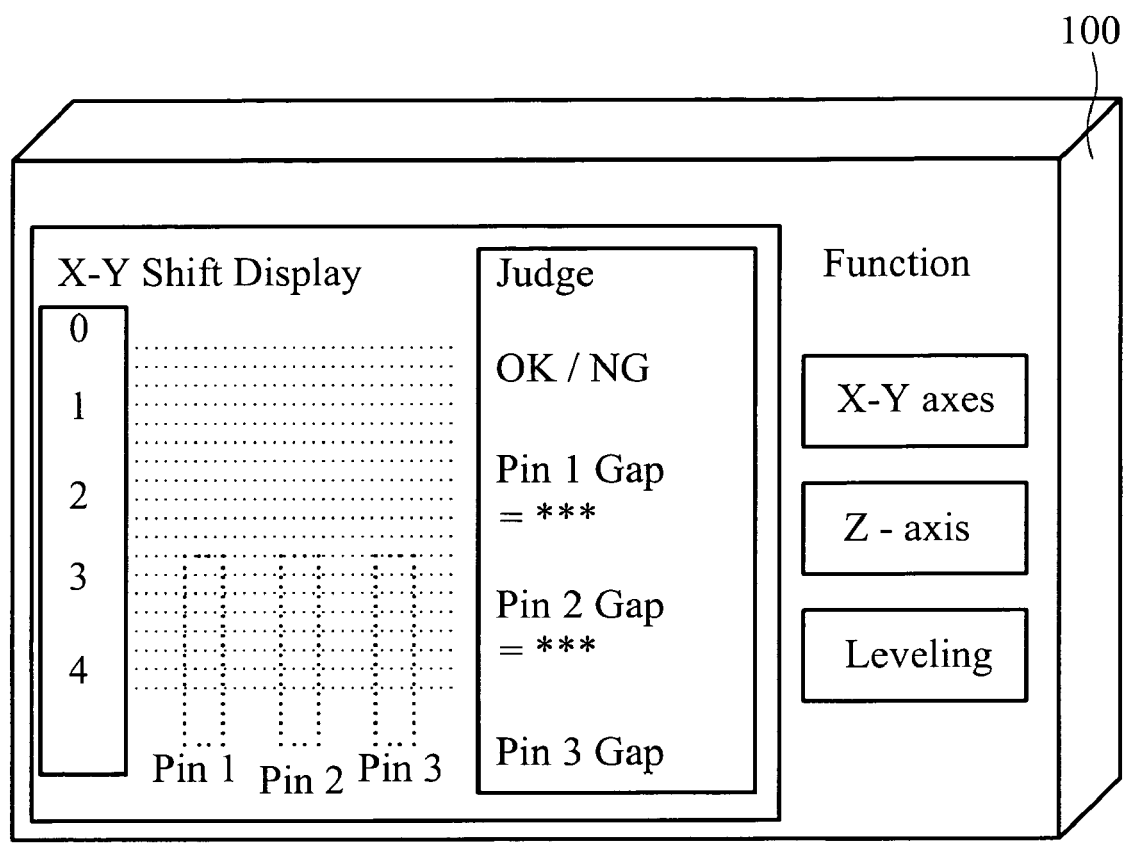
FIG. 9C is a schematic view of displaying the Z-axis gap sizes shown in FIGS. 9A and 9B.

The process of detecting the Z-axis gap size using optical scale 220 is described in the following. Referring to FIG. 9A, one optical scale of optical scale 220 serves as a transmitter to transmit a parallel beam of light, and the other optical scale of optical scale 220 serves as a receiver to receive the parallel beam of light and responds with an obstructive state to corrector 100 for determining the size of the Z-axis gap. Referring to FIG. 9B, a pair of pincettes 300 clips wireless 3D offset monitor sensor 200 and is located above the pins of three-pin process plate 400. Next, a pair of pincettes 300 move wireless 3D offset monitor sensor 200 forward and backward to pass through each pin of the three-pin process plate 400, thereby detecting the Z-axis gap size between a pin and a wafer. The sensor responds corrector 100 with detected Z-axis gap sizes using optical scale 220. Corrector 100 displays detected Z-axis gap sizes of each pin on a screen thereof (as shown in FIG. 9C) and determines whether a Z-axis gap size of each pin exceeds a threshold value when calculated.

Electronic leveling sensor 210 compares a center position of center mark 550 with a center position of criterion mark 235 to obtain an offset of a robot arm along the XY-axes. A detailed description of the process thereof is provided in the following.

Figure 10A:
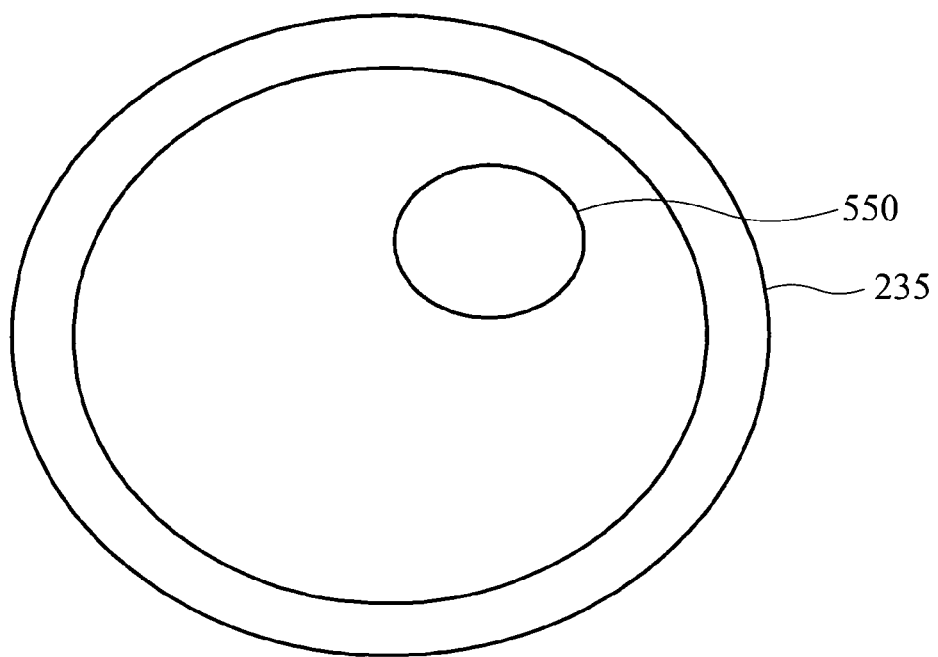
FIGS. 10A and 10B are schematic views of inspecting offsets using an XY-axes CCD monitor sensor.
Figure 10B:
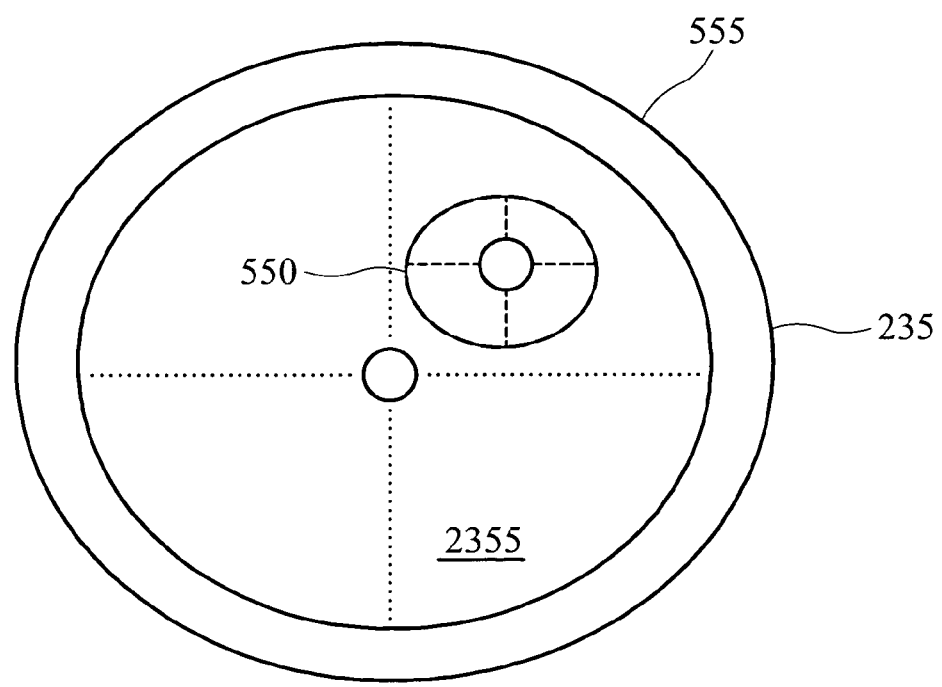
Figure 10C:
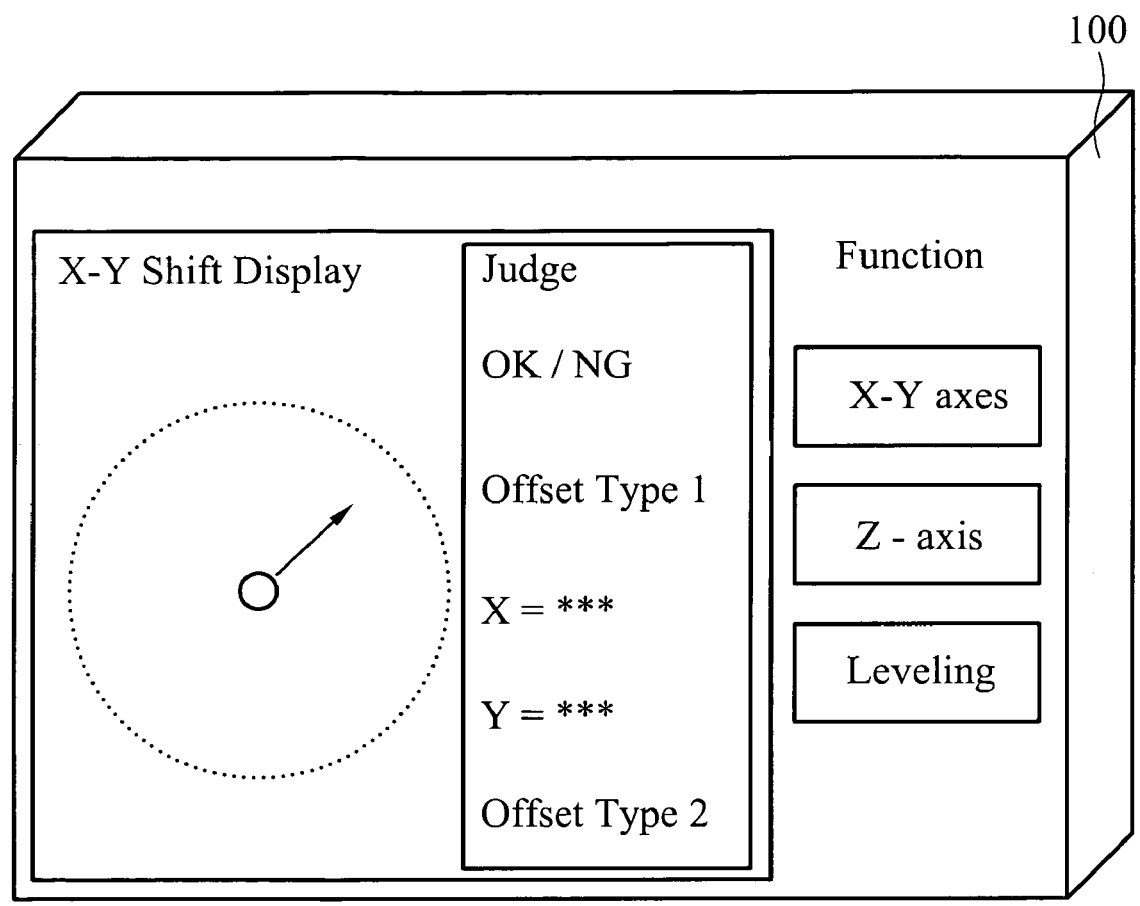
FIG. 10C is a schematic view of displaying the offsets shown in FIGS. 10A and 10B.

Referring to FIG. 10A, center mark 550 of process plate 500 is first obtained. Center position 555 of center mark 550 is compared with center position 2355 of criterion mark 235, as shown in FIG. 10B. The sensor responds to corrector 100 with relative position information between center position 555 and center position 2355 for calculating an offset of process plate 500, thereby obtaining an offset of a robot arm along the XY-axes.

A wireless 3D auto-offset system for robot arms of the invention is not limited to worker stature and can prevent artificial adjustment from affecting tool adjustment and automatically display sensing and judgment results.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wireless 3D auto-offset system for robot arms, comprising:
    a wireless 3D offset monitoring sensor, comprising
        an electronic tilt detector comprising an arcuate body, the interior thereof filled with liquid material and having a bubble; and
        a sensor, sensing positions of the bubble; and
    a corrector, retrieving and displaying the bubble positions using the sensor on a screen thereof, determining whether a process apparatus is horizontally located according to a predefined standard range, and, if not, calculating an offset value of the process apparatus.

2. The wireless 3D auto-offset system for robot arms as claimed in claim 1, wherein the sensor is a CCD sensor, detecting three-dimensional (3D) positions of the bubble.

3. The wireless 3D auto-offset system for robot arms as claimed in claim 1, wherein the process apparatus is a pair of pincettes of a robot arm, pins of a three-pin process plate, and a process plate.

4. A wireless 3D auto-offset system for robot arms, comprising:
    a three-pin process plate having three pins;
    a wireless 3D offset monitoring sensor, comprising an optical scale and installed above the three-pin process plate, wherein the optical scale is a dual optical scale in which one optical scale serves as a transmitter to transmit a parallel beam of light and the other optical scale serves as a receiver to receive the parallel beam of light; and
    a corrector, retrieving an obstructive state of receiving the parallel beam of light from the wireless 3D offset monitoring sensor, displaying light signals on a screen thereof, and determining whether a Z-axis gap size of each pin of the three-pin process plate exceeds a threshold value.

5. The wireless 3D auto-offset system for robot arms as claimed in claim 4, further comprising a pair of pincettes of a robot arm, clipping the wireless 3D offset monitoring sensor to move forward and backward, enabling the dual optical scale to pass through each pin of the three-pin process plate.

6. A wireless 3D auto-offset system for robot arms, comprising:
    a process plate having a center mark;
    a wireless 3D offset monitoring sensor, installed above the three-pin process plate and comprising a sensor provided with a criterion mark, wherein the sensor compares a center position of the center mark with a center position of the criterion mark; and
    a corrector, retrieving relative position information according to the center positions of the center mark and the criterion mark, determining whether an offset is detected according to the relative position information, and, if so, calculating an offset value.

7. The wireless 3D auto-offset system for robot arms as claimed in claim 6, wherein the sensor is an XY-axes CCD monitor sensor.

* * * * *